United States Patent
Joswig et al.

(10) Patent No.: US 8,062,781 B2
(45) Date of Patent: Nov. 22, 2011

(54) DEGASSING SYSTEM FOR AN ACCUMULATOR, AND ACCUMULATOR COMPRISING A DEGASSING SYSTEM

(75) Inventors: Ralf Joswig, Buchholz (DE); Martin Wiegmann, Borstel (DE)

(73) Assignee: Johnson Controls Hybrid and Recycling GmbH, Hannover (DE)

(*) Notice: Subject to any disclaimer, the term of this patent is extended or adjusted under 35 U.S.C. 154(b) by 0 days.

(21) Appl. No.: 12/875,676

(22) Filed: Sep. 3, 2010

(65) Prior Publication Data

US 2011/0052947 A1    Mar. 3, 2011

Related U.S. Application Data

(63) Continuation of application No. PCT/EP2009/001372, filed on Feb. 26, 2009.

(30) Foreign Application Priority Data

Mar. 7, 2008 (DE) .................. 10 2008 013 186

(51) Int. Cl.
*H01M 2/12* (2006.01)
(52) U.S. Cl. .............. 429/82; 429/83; 429/54; 429/508; 429/89

(58) Field of Classification Search ............... 429/82, 429/89, 83, 508
See application file for complete search history.

(56) References Cited

U.S. PATENT DOCUMENTS 2,480,437 A * 8/1949 Berg et al. ................ 429/53

FOREIGN PATENT DOCUMENTS

| DE | 9104291 U1 | 7/1991 |
| EP | 0627779 B1 | 9/1998 |
| EP | 1233463 A2 | 8/2002 |
| JP | 09181460 A | 7/1997 |
| SU | 393785 A1 | 8/1973 |

OTHER PUBLICATIONS

International Search Report with English translation for International Application No. PCT/EP2009/001372, dated Jul. 3, 2009, 6 pages.
English Translation of the Written Opinion for International Application No. PCT/EP2009/001372, dated Jul. 3, 2009, 7 pages.

* cited by examiner

*Primary Examiner* — Jane Rhee
(74) *Attorney, Agent, or Firm* — Foley & Lardner LLP

(57) ABSTRACT

A degassing system for an accumulator includes a corso with a degassing opening, a pin that is arranged in the corso, at least one flap that is mounted such that it can rotate around the pin, a spring that is arranged to exert a torque on the at least one flap, and a seal that is arranged such that the at least one flap rests on the seal in a rest position and closes the degassing opening.

22 Claims, 4 Drawing Sheets

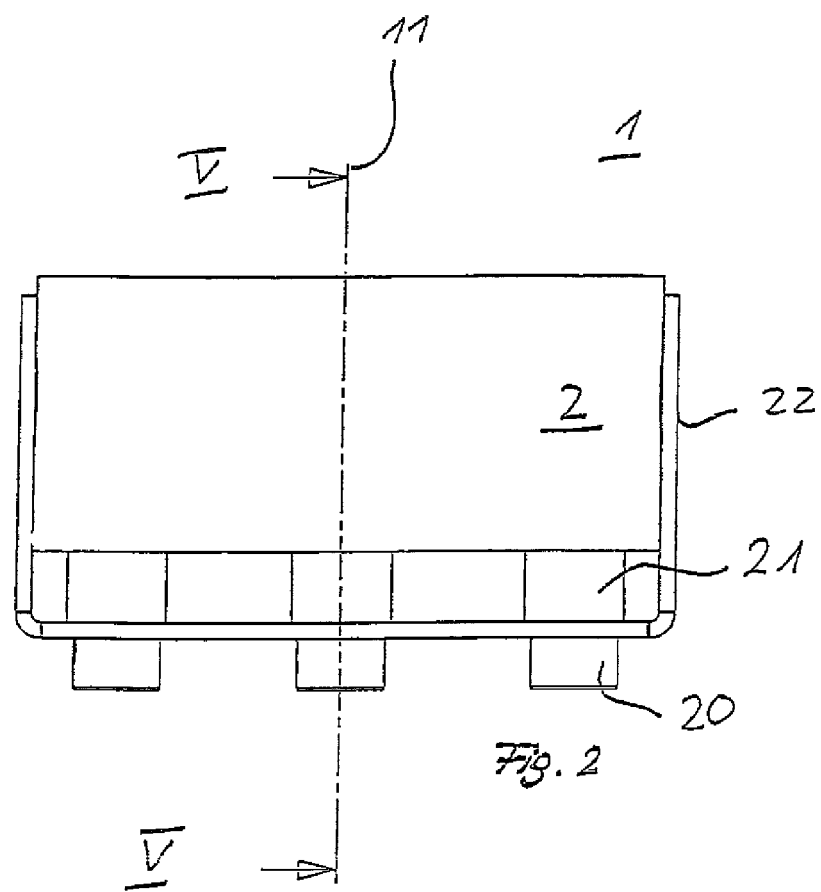
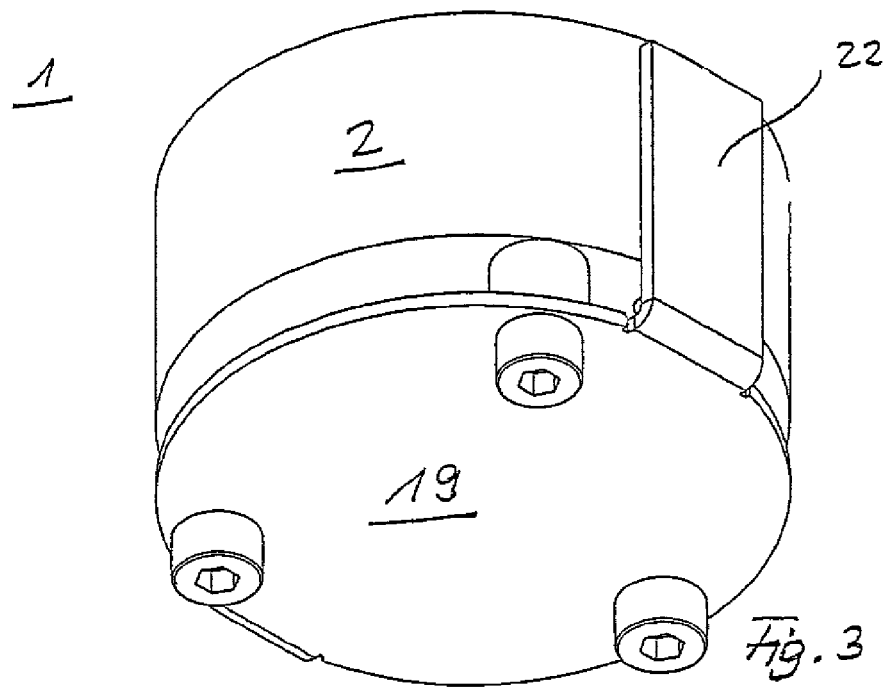

DEGASSING SYSTEM FOR AN ACCUMULATOR, AND ACCUMULATOR COMPRISING A DEGASSING SYSTEM

CROSS-REFERENCE TO RELATED PATENT APPLICATIONS

This application is a Continuation of International Application No. PCT/EP2009/001372, filed Feb. 26, 2009, which claims priority to German Patent Application DE 10 2008 013 186.5, filed Mar. 7, 2008. The entire disclosures of International Application No. PCT/EP2009/001372 and German Patent Application DE 10 2008 013 186.5 are incorporated herein by reference.

BACKGROUND

The invention relates to a degassing system for an accumulator, in particular for hybrid accumulators, nickel-metal-hydride accumulators and lithium-ion accumulators.

The invention furthermore relates to an accumulator having a degassing system.

High-power accumulators with high energy densities in the electrochemical cells are used in particular in hybrid vehicles and in electrical vehicles.

The high energy densities lead to a large amount of heat being developed. In order to maintain the performance of the accumulators and to make it possible to ensure the performance in a wide operating window, effective cooling of the accumulators is necessary. It is furthermore necessary for the accumulators to have a safety system which acts in the event of overheating of the accumulators, in order in particular to prevent an explosion of the cells.

In addition to effective cooling and a safety system for protection against overheating, high-power accumulators require a safety system for protection of the accumulator against excessive gas pressure in the accumulator. The excessive gas pressure can lead to sudden reactions and to ignition of the accumulator. This can endanger people and the surrounding area.

Furthermore, the interior of the accumulators must be protected against dust and against water splashes caused, for example, by high-pressure cleaners or steam jets.

One object of the present invention is therefore to provide a degassing system for an accumulator, which offers effective protection against excessive gas pressure and against external contamination. A further object of the present invention is to provide an accumulator housing and an accumulator which are effectively protected against excessive gas pressure and against external contamination.

SUMMARY

An exemplary embodiment relates to a degassing system for an accumulator that includes a corso with a degassing opening, a pin that is arranged in the corso, at least one flap that is mounted such that it can rotate around the pin, a spring that is arranged to exert a torque on the at least one flap, and a seal that is arranged such that the at least one flap rests on the seal in a rest position and closes the degassing opening.

Another exemplary embodiment relates to an accumulator housing that includes a degassing system. The degassing system includes a corso with a degassing opening, a pin that is arranged in the corso, at least one flap that is mounted such that it can rotate around the pin, a spring that is arranged to exert a torque on the at least one flap, and a seal that is arranged such that the at least one flap rests on the seal in a rest position and closes the degassing opening.

Another exemplary embodiment relates to an accumulator that includes an accumulator housing and a degassing system. The degassing system includes a corso with a degassing opening, a pin that is arranged in the corso, at least one flap that is mounted such that it can rotate around the pin, a spring that is arranged to exert a torque on the at least one flap, and a seal that is arranged such that the at least one flap rests on the seal in a rest position and closes the degassing opening.

BRIEF DESCRIPTION OF THE DRAWINGS

The invention will be explained in more detail with reference to one exemplary embodiment, which is illustrated in the following figures, in which:

FIG. 2 shows a side view of the degassing system according to the invention, in the assembled state, FIG. 3 shows a perspective view, from underneath, of the degassing system according to the invention.

DETAILED DESCRIPTION

Figure 1:
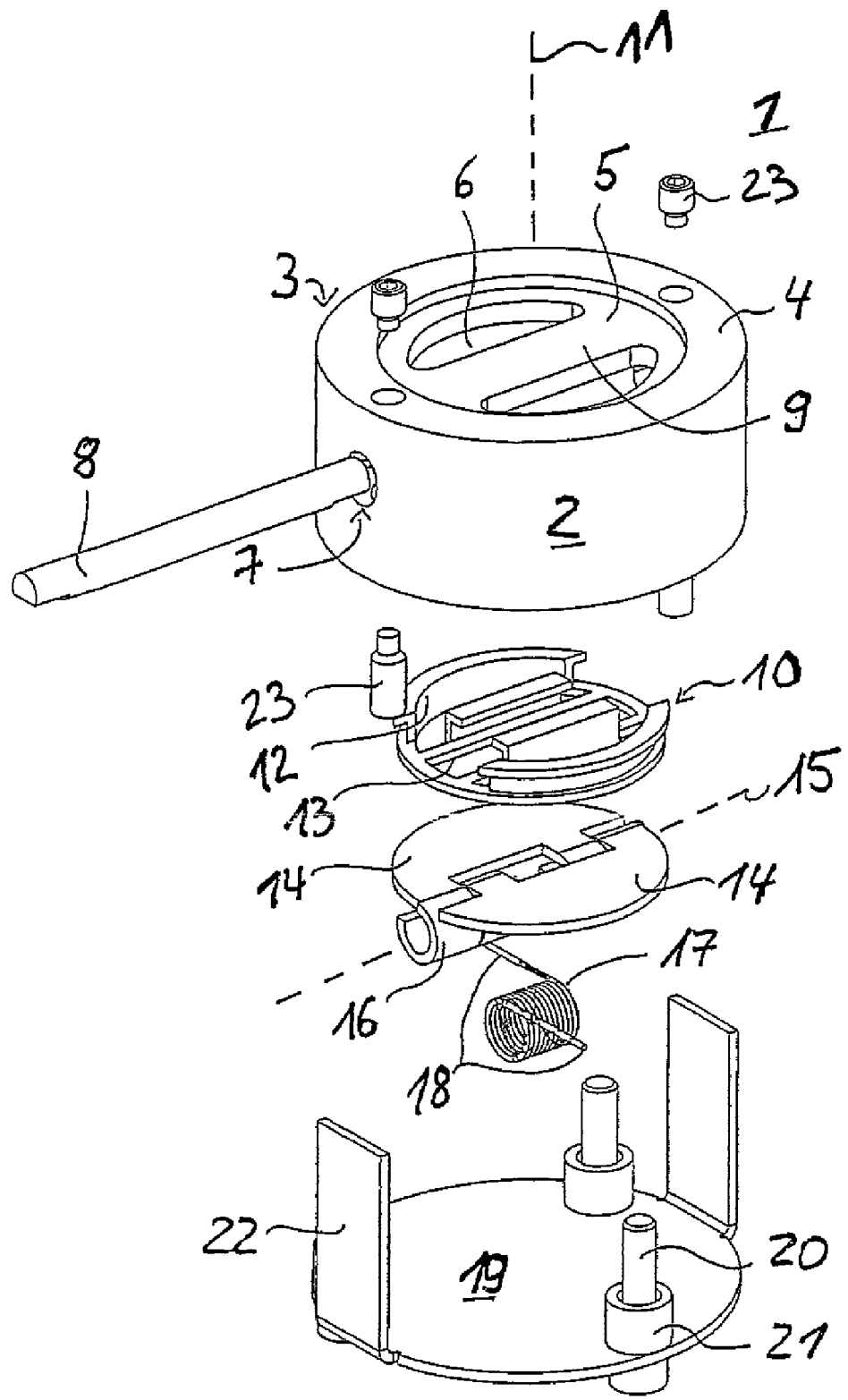
FIG. 1 shows an exploded view of a degassing system according to the invention.

The degassing system according to the invention allows rapid pressure equalization between the accumulator interior and the accumulator surrounding area, when a cell within the accumulator housing releases a large amount of gas as a consequence of overcharging, of a short circuit, or for some other reason. The large amount of gas released gathers in the accumulator housing and produces a gas internal pressure which is greater than the ambient pressure (referred to for short as excessive gas pressure). The at least one flap, which is mounted such that it can rotate around the pin, opens at a specific excessive gas pressure, and allows gas to escape from the accumulator housing.

The flap preferably opens as a function of the excessive gas pressure. For example, it is possible for the flap to be slightly opened even at a very low excessive gas pressure, and to be opened completely at a predefined excessive gas pressure, for example at an excessive gas pressure of half a bar, or one bar.

A further advantage of the degassing system according to the invention is that water condensation which gathers on the base of the accumulator housing can run out between the seal and the at least one flap.

Furthermore, the accumulator interior is reliably protected against external influences (for example water splashes or dust) by the degassing system according to the invention. This protection is achieved by arranging the at least one flap such that the flap is pressed against the seal by the water splashes or the like, thus effectively closing the gas outlet opening.

The protection of the accumulator interior and of the at least one flap against external influences can be improved by arranging a baffle plate under the at least one flap. The baffle plate is arranged such that it protects the at least one flap as well as possible against being directly affected by external influences.

In a plane at right angles to the longitudinal axis of the degassing system, the baffle plate is preferably at least of precisely the same size as the at least one flap, and is arranged under the at least one flap in the axial direction.

In one special embodiment, two and only two flaps are provided, and are arranged symmetrically around the pin. The pin is then located between the two flaps. The two flaps and the spring (it is also possible to provide a spring for each flap) are arranged with respect to one another such that an opposing torque is exerted on the two flaps. This ensures that, in the installed state, they open downward against a torque produced by the spring or the springs, and are forced upward against the seal.

The invention provides for the degassing system to have an essentially circular cross section. In particular, a seal, which is in this case annular, has advantageous sealing characteristics over seals with angles. However, it is not impossible to also use other cross-sectional areas, for example rectangular or square areas.

According to the invention, an accumulator housing having a degassing system according to the invention is also provided. The degassing system is preferably fitted to the housing base of the accumulator housing. It is also possible to provide a plurality of degassing systems, depending on the requirement and in particular on the size of the accumulator housing.

The accumulator housing according to the invention is particularly suitable for accumulators which are in the form of hybrid accumulators, nickel-metal-hydride accumulators or lithium-ion accumulators, in which high energy densities can occur.

Furthermore, according to the invention, an accumulator is provided having an accumulator housing according to the invention. The accumulator according to the invention preferably has a multiplicity of cells which are accommodated in the accumulator housing. The accumulator has all the components which are required for correct use, of course, such as a positive and a negative pole.

FIG. 1 shows a degassing system 1 according to the invention.

The degassing system 1 comprises a corso 2. A corso means a base body in which holes for the attachment of other components are preferably also located. The corso 2 has a cylindrical shape with a circular cross-sectional area. The upper face 3 of the corso 2 has a circular edge 4 and is centrally recessed in a circular shape. The circular recess 5 has a degassing opening 6.

The degassing opening 6 consists of two openings in the form of circular sections (in each case formed from a circular arc and a secant), which are arranged symmetrically with respect to a diagonal of the recess 5.

On its casing, the corso 2 has two diagonally opposite holes 7, only one of which can be seen, however. A pin 8 can be mounted in the holes 7. The pin 8 expediently has a circular-cylindrical shape.

In the assembled state, the pin 8 is mounted in the corso 2 such that it is arranged under a web 9 which is located between the two components of the degassing opening 6 which are in the form of circular sections.

The degassing system furthermore comprises a seal 10. The seal 10 has attachment sections 12 which are oriented vertically with respect to a longitudinal axis 11. The attachment sections 12 have L-shaped cross sections (at right angles to the longitudinal axis 11). The attachment sections 12 are shaped such that they can be plugged through the degassing openings 6 and, by virtue of the L-shaped cross-sectional areas, rest on the recess 5. This results in the seal 10 being firmly seated in the vertical direction (that is to say in the direction of the longitudinal axis 11).

The seal 10 has openings 13 which correspond with the degassing opening 6 so as not to impede a gas flow from the interior of an accumulator to the outside. The openings 13 are preferably approximately of the same shape and size as the degassing openings 6.

Two flaps 14 are arranged under the seal 10. The flaps 14 have essentially semicircular cross-sectional areas. The flaps 14 are connected to one another along a diagonal such that they can pivot relative to one another about the diagonal 15.

The flaps are in the form of hollow cylinders in places along the diagonal 15, such that the pin 8 can be guided along the diagonal 15 through these hollow cylinders. The hollow cylinders themselves need not be completely closed on their envelope surfaces. The important factor is for the pin 8 to be surrounded sufficiently that the flaps 14 can be pivoted reliably around the pin 8.

A spring 17 can be seen under the flaps 14.

The spring 17 is composed of a suitable metal wire wound in a spiral shape. The ends 18 are lengthened.

In the assembled state, the ends 18 rest on the flaps 14 from underneath. The spring 17 is wound such that it presses the flaps 14 upward against the seal 10 with respect to the longitudinal axis 11. An equal but opposite torque is therefore exerted on the two flaps 14.

If the internal pressure in the accumulator housing rises, such that an excessive gas pressure is produced, then the flaps 14 are forced downward against the spring force 8, thus allowing gas to escape from the accumulator housing through the degassing opening 6.

Finally, a baffle plate 19 is provided in order to protect the accumulator interior and the degassing system 1, and is arranged under the flaps 14. The baffle plate 19 is mounted at a predefined distance from the lower face of the corso 2. In the present case, the baffle plate is attached by screws 20, which are passed through the baffle plate 19 and are screwed in the corso 2. The predefined distance is ensured by spacers 21.

The baffle plate 19 has two vanes 22, which face vertically upwards.

In the assembled state, the vanes 22 rest on the outside on the corso 2 such that they cover the holes 7. The holes 7 are therefore protected against the ingress of external influences.

FIG. 2 shows the degassing system 1 from FIG. 1, in the form of a side view and in the assembled state.

FIG. 3 shows a perspective view of the degassing system 1 from underneath (seen from the outside).

Figure 4:
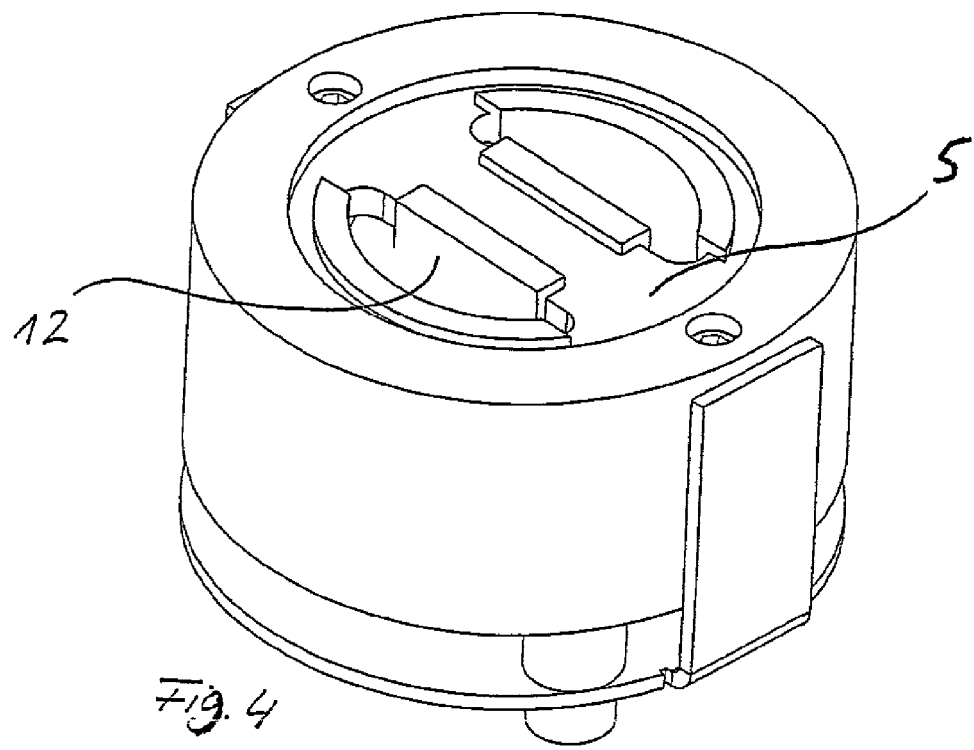
FIG. 4 shows a further perspective view, from above, of the degassing system according to the invention.

As can be seen well from FIG. 4, the L-shaped attachment sections 12 engage on the recess 5 from above, ensuring that the seal 10 is firmly seated.

Figure 5:
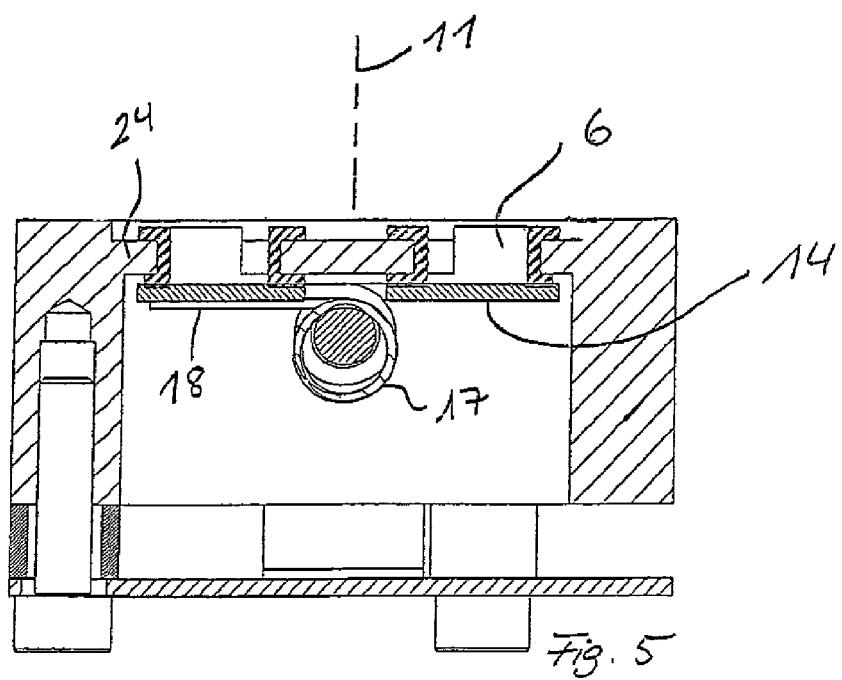
FIG. 5 shows a section view, of the degassing system according to the invention, in the direction V from FIG. 2, with the degassing opening closed.

FIG. 5 shows a cross-sectional view of the assembled degassing system 1 in the direction V from FIG. 2.

As can be seen well, the flaps 14 are forced upward by the spring 17, or the ends 18 of the spring 17, such that they are aligned essentially horizontally, that is to say at right angles to the longitudinal axis 11. The upward movement of the flaps 14 is limited by horizontally running projections 24. There is no need to have a plurality of projections 24, and it is also possible for the projection 24 to run around the longitudinal axis 11 in the form of a circle.

Figure 6:
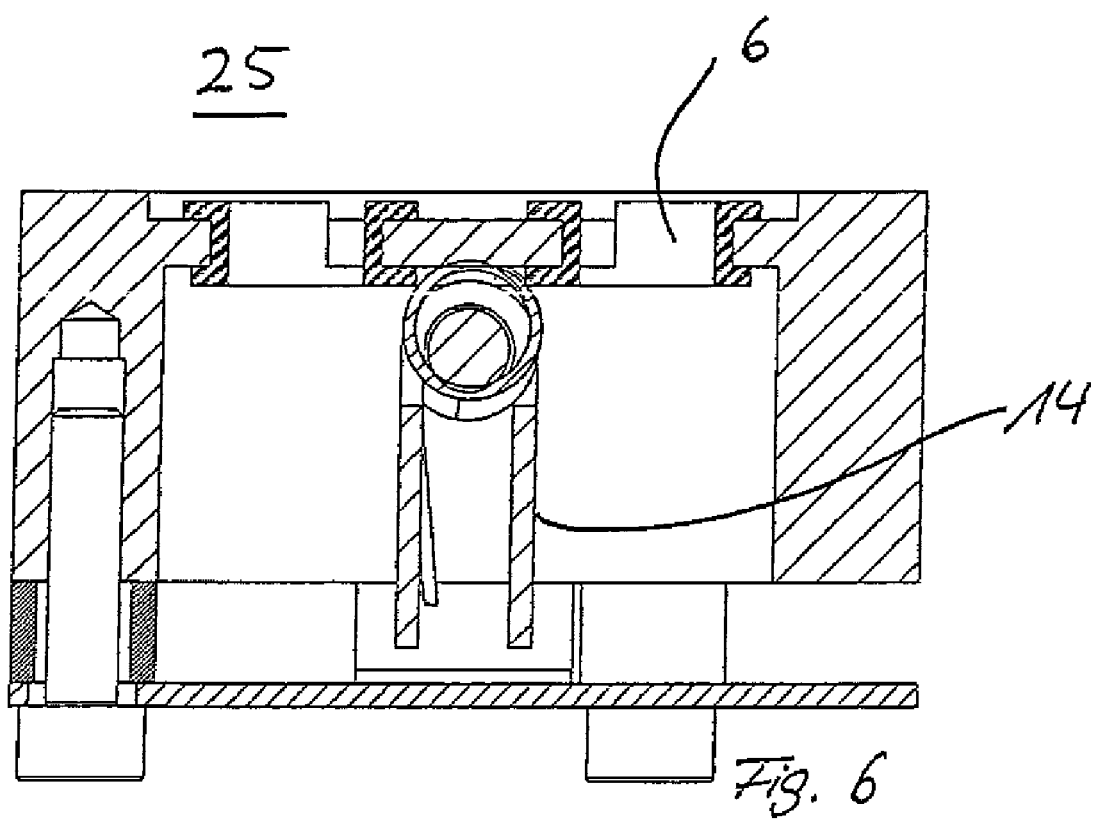
FIG. 6 shows a section view, in the direction V from FIG. 2, with the degassing opening open.

FIG. 6 shows the view from FIG. 5 with the degassing openings 6 released. This can be seen from the fact that the flaps 14 are folded essentially vertically downward. This is possible because there is a higher gas pressure on the inside 25 of the accumulator than in the area 26 surrounding the accumulator.

The excessive gas pressure is sufficiently high to fold the flaps 14 completely downward against the spring force. In this position, very rapid pressure equalization is possible. In the present example, the excessive gas pressure for this state is approximately one bar.

The pin 8 can be aligned with the aid of adjusting screws 23. For this purpose, the adjusting screws 23 are guided parallel to the axis and above and below the pin 8.

What is claimed is:

1. A degassing system for an accumulator, wherein the degassing system comprises:
   a corso with a degassing opening to allow gas to pass through the corso;
   a pin arranged in the corso such that gas passes around the pin;
   at least one flap that is mounted such that it can rotate around the pin;
   a spring that is arranged to exert a torque on the at least one flap; and
   a seal that is arranged such that the at least one flap rests on the seal in a rest position and closes the degassing opening.

2. The degassing system of claim 1, further comprising a baffle plate that is arranged under the at least one flap.

3. The degassing system of claim 1, wherein the at least one flap comprises two flaps arranged symmetrically around the pin.

4. The degassing system of claim 1, wherein the degassing system has an essentially circular cross section.

5. An accumulator housing comprising:
   a degassing system comprising:
      a corso with a degassing opening;
      a pin arranged in the corso such that gas passes around the pin when gas passes through the degassing opening;
      at least one flap that is mounted such that it can rotate around the pin;
      a spring that is arranged to exert a torque on the at least one flap; and
      a seal that is arranged such that the at least one flap rests on the seal in a rest position and closes the degassing opening.

6. The accumulator housing of claim 5, wherein the degassing system further comprises a baffle plate that is arranged under the at least one flap.

7. The accumulator housing of claim 5, wherein the at least one flap comprises two flaps arranged symmetrically around the pin.

8. The accumulator housing of claim 5, wherein the degassing system has an essentially circular cross section.

9. The accumulator housing of claim 5, wherein the degassing system is fitted to a housing base of the accumulator housing.

10. An accumulator comprising:
    an accumulator housing; and
    a degassing system comprising:
       a corso with a degassing opening to allow gas to pass through the corso;
       a pin arranged in the corso such that gas passes around the pin when gas passes through the corso;
       at least one flap that is mounted such that it can rotate around the pin;
       a spring that is arranged to exert a torque on the at least one flap; and
       a seal that is arranged such that the at least one flap rests on the seal in a rest position and closes the degassing opening.

11. The accumulator of claim 10, wherein the degassing system further comprises a baffle plate that is arranged under the at least one flap.

12. The accumulator of claim 10, wherein the at least one flap comprises two flaps arranged symmetrically around the pin.

13. The accumulator of claim 10, wherein the degassing system has an essentially circular cross section.

14. The accumulator of claim 10, wherein the degassing system is fitted to a housing base of the accumulator housing.

15. The accumulator of claim 10, further comprising a plurality of electrochemical cells arranged in the accumulator housing.

16. The accumulator of claim 15, wherein the electrochemical cells are lithium-ion cells or nickel-metal-hydride cells.

17. The degassing system of claim 1, wherein the spring surrounds the pin.

18. The degassing system of claim 1, wherein the spring is located within the corso.

19. The accumulator housing of claim 5, wherein the spring surrounds the pin.

20. The accumulator housing of claim 5, wherein the spring is arranged within the corso.

21. The accumulator of claim 10, wherein the spring surrounds the pin.

22. The accumulator of claim 10, wherein the spring is provided within the corso.

* * * * *